Feb. 22, 1949.　　　　J. R. CRAIG　　　　2,462,612
LIQUID TREATING APPARATUS
Filed July 19, 1945　　　　　　　　　　　　　2 Sheets-Sheet 2
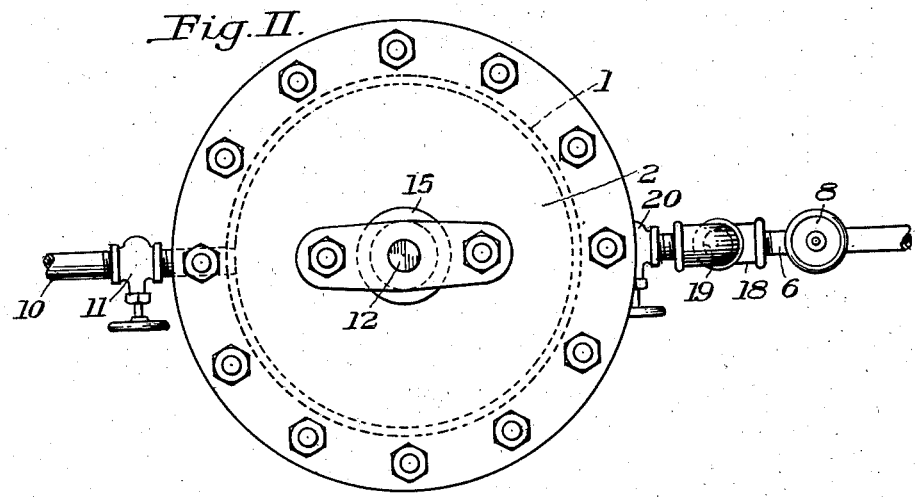
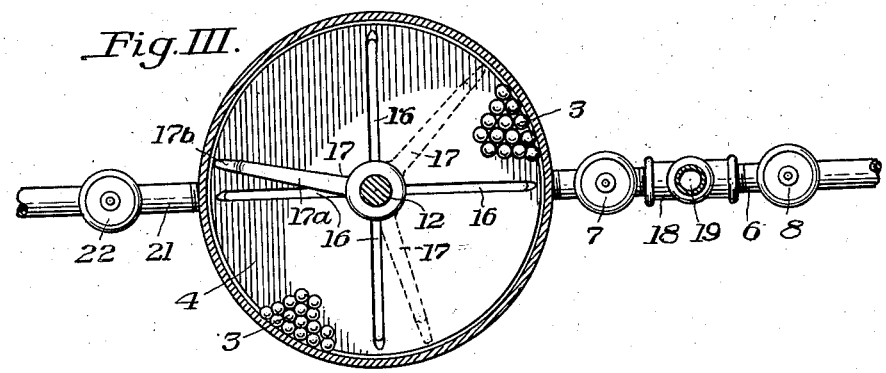
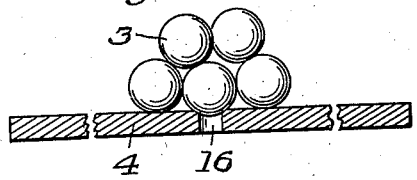
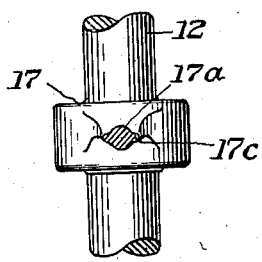
INVENTOR
JOHN R. CRAIG, DECEASED,
BY UNION TRUST CO. OF PITTSBURGH, PA. ADMINISTRATOR
by William B. Wharton
his attorney Patented Feb. 22, 1949

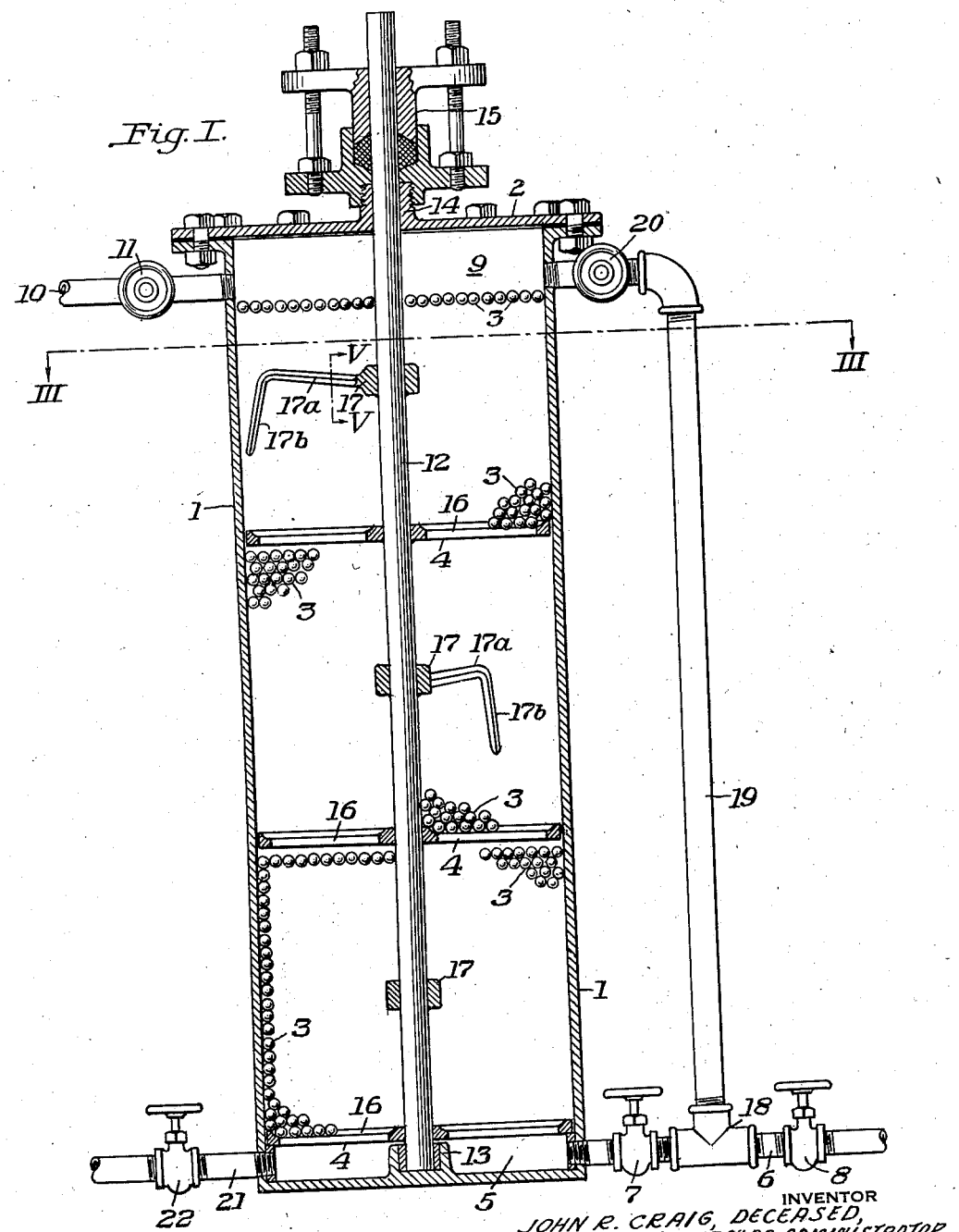

2,462,612

UNITED STATES PATENT OFFICE 2,462,612

LIQUID TREATING APPARATUS

John R. Craig, deceased, late of Pittsburgh, Pa., by The Union Trust Company of Pittsburgh, Pittsburgh, Pa., administrator Application July 19, 1945, Serial No. 605,926

5 Claims. (Cl. 210—143)

This invention relates to the purification treatment of water and other liquids.

The invention resides in the field of liquid purification, and particularly the treatment of water, by passage through masses, or beds, of glass balls. The use of small glass balls massed in containers through which water to be treated is run, is of itself, very old and well known. Such treatment is of specialized sort and presents certain advantages over filtration on the one hand, and chemical reaction as with base exchange bodies on the other hand. As water flows through masses of glass balls with abrupt changes in the velocity, as well as in the direction of its flow, there is a tendency for the surfaces of those bodies in contact with the water to promote a deposition of substances carried by the water. Such substances form a deposit on the surfaces of the glass balls, which in service are within a relatively short period of time so covered with deposited material that their effectiveness is lost. It has been the general experience of those using the glass ball method of treating liquids that the mere effect of forced passage of water in counterflow through the beds or masses of the glass balls is ineffective to free the balls of the deposits which have built up on them. Further difficulty in cleansing the balls of deposited matter is caused by the fact that the balls themselves are frangible, and that a broken mass of glass particles is less effective in purification and less desirable in use than is a bed formed of glass balls of approximately regular contour.

It is the object of the invention to provide in water treating apparatus comprising a bed, or beds, of glass balls, means which will act upon the unitary bodies composing such beds to clear the bed as a whole of deposits carried by the balls, and to do this without substantial breakage of the glass balls of which the bed is composed.

In the accompanying drawings:

Fig. I is a central vertical sectional view through liquid treating apparatus comprising a plurality of superposed beds of glass balls, and comprising means in accordance with the invention for cleansing the balls of which the beds are composed.

Fig. II is a plan view of the liquid treating apparatus shown in Fig. I.

Fig. III is a cross-sectional view taken in the plane of the section line III—III of Fig. I.

Fig. IV is a detail view through one of the rotatable ball carrying disks or platforms forming a structural element of the apparatus.

Fig. V is a cross-sectional detail view through an agitator arm forming part of agitating means comprised in the liquid treating apparatus taken on the section line V—V of Fig. I.

The illustrated structural embodiment of the liquid treating apparatus comprises an enclosing receptacle in the form of a shell 1 having a removable cover 2. Within the shell are a multiplicity of small glass balls 3 which form a contact bed or beds. In shell 1 and supporting the small glass balls therein are one or more disk-form platforms 4. Desirably as shown a plurality of such platforms are provided to support a plurality of beds of the glass balls at different levels throughout the height of shell 1, and to cooperate in the operation of cleansing those balls of material deposited from the liquid which is subjected to purification. The affluent liquid is supplied to a space 5 beneath the lowest of the contact beds by a line 6 provided with valves 7 and 8. This liquid, supplied under pressure, rises through the several beds of the treating apparatus and from space 9 overlying the uppermost bed of the organization is discharged as effluent by way of line 10 provided with valve 11. In its passage upwardly through the successive contact beds the liquid is purified in accordance with the well known function performed by beds composed of small bodies of glass or other siliceous materials. This causes substances removed from the water to be deposited on the surfaces of the balls 3. When the originally effective surfaces of a substantial proportion of the balls have become coated with the deposited matter their original effectiveness is lost, as is indicated by changes in the flow, or properties, of the effluent.

The invention herein resides in the means provided for cleansing the surfaces of the glass balls 3 to restore their effectiveness. Because of the fact that washing alone is inadequate to dislodge deposits from the surfaces of the balls forming the contact beds, the apparatus provides means which so agitate the balls as to produce movement throughout approximately the entire mass of each bed.

The agitating means of the apparatus comprises a vertical shaft 12, which is mounted rotatably in bosses 13 and 14 on the base of shell 1 and on cover 2 respectively and passes through a stuffing box 15. Any suitable connections may be provided for rotating the assembly composed primarily of shaft 12 and the ball-carrying platforms 4, which latter are secured to the shaft in fixed relation thereto. The rotatable assembly also comprises specialized means for causing a general agitation of the glass balls forming each bed, and rubbing of the balls against each other when the assembly is rotated. The agitating elements are formed and arranged to take into account the tendency for each of the platforms in its rotation to slip beneath the packed mass of balls forming the contact bed which it carries without producing in the mass of the balls agitation adequate to loosen the deposits they carry.

One ball-agitating element of the rotatable assembly is provided by the platform 4, and consists of irregular surface structure of the platform extending across the plane in which the platform rotates. Such surface irregularity preferably is in the form of the through-slots 16 shown in the drawings. In the detail showing of Fig. IV, it will be seen that some of the balls 3 which are in direct contact with the surface of the platform 4 rest in the slots 16. When the platform rotates there is a tendency for those balls to move with the platform and against the balls which are in contact with them. This tendency causes the balls which were originally seated in slots 16 to ride out of those slots, with a lifting movement transmitted through the packed mass of balls; and as other balls take their place during continued rotation of the platform there is a continuance of the action, with a resultant churning movement which is in part upwardly directed. Spaced slots, such as the four slots 16 shown in each of the platforms 4, are preferred, for the reason that they effectively perform the dual function of agitation and of providing passage for liquid from chamber to chamber within shell 1. Structural irregularity at the upper ball-contacting face of the platform may be provided with substantial equivalency by spaced ball-contacting grooves or ribs, accompanied by perforations for the passage of liquid. Also spaced perforations of suitable size and arrangement may be provided instead of continuous slots as shown.

An additional agitating element for insuring an adequate cleansing agitation of balls 3 in rotation of the ball-carrying platform is carried by the shaft 12. Such means is shown as an agitator arm 17 secured to shaft 12 intermediate the height of the chamber to rotate with the shaft. The most efficient form of this arm 17 is as shown, with a portion 17a extending outwardly from the shaft toward the periphery of the chamber with a slight upward inclination, and a portion 17b extending downwardly and slightly outwardly toward the chamber wall. Desirably, as shown, both portions of the agitator arm have along their lateral edges rounded ribs 17c purposed to separate the balls of the packed mass forming the contact bed without exerting a crushing effect on them.

The primary effect of agitator arm 17, like that of the irregularity in the surface structure of the ball-carrying platform is to cause agitation of the balls 3 and rubbing of those balls against each other as shaft 12 is rotated. During such rotation with the above noted tendency for the balls forming the contact bed to remain as a packed mass, rotation of agitator arm 17 with shaft 12 causes the arm to move through the mass to promote movement of the balls in various directions, both by its own pushing action and by the deflecting action it adds to the horizontally directed forces of rotation and to vertical movement of the balls. The form of the path described in the bed by an arm of irregular shape, such as the illustrated shape of arm 17 enhances this effect. Thus the agitator arm and the irregular surface structure of the platform cooperatively function to convert the tendency for the contact bed to remain stationary during rotation of the shaft and platform into relative movement of the individual balls in the bed, with a rubbing action serving to scour their surfaces. In the illustrated embodiment of the apparatus one of the agitator arms 17 is shown in each of the three chambers of the apparatus defined by the ball-carrying platforms 4. In order to preserve balance in the apparatus during a cleansing operation, these arms desirably are positioned as shown in uniform angular spacing around the shaft.

The liquid connections to the treating apparatus are arranged to provide downflow of liquid through the contact bed, or beds, of the apparatus during the operation of cleaning the balls. Such connections are shown as a T-coupling 18 in the affluent line 6 between valves 7 and 8. From coupling 18 a branch pipe 19 leads by way of valve 20 to the space 9 overlying the uppermost contact bed. In cleansing, therefore, the agitating assembly of the apparatus is rotated. Valve 7 leading into the space 5 beneath the lowest platform 4 is closed, as is also valve 11 in the effluent line 10. Valves 8 and 20 being open, the washing liquid passes through connecting pipe 19 to chamber 9 and downwardly through the several contact beds of the apparatus to chamber 5, from which it is discharged through waste line 21, the valve 22 of which has been opened. During this operation there is thus a scrubbing action caused by the scouring of the balls in rubbing against each other in the presence of the washing liquid, and a downward washing of the detached substance of the deposits on the balls to waste line 21.

The operation of cleaning the glass balls of a contact bed, or the several contact beds of a multi-chamber liquid treating apparatus, is thus very simple inasmuch as the operation cleans the balls in place in the shell of the apparatus merely by rotation of its associated shaft, and because the cleaning operation is rapidly and effectively performed. The apparatus may thus be kept at approximately full efficiency by relatively short and frequently repeated cleaning periods. It has been found that the apparatus is capable of clearing its glass balls not only of deposits gathered from the treatment of water, but also of the deposits gathered from the treatment of various other inorganic and organic liquids, such as gasoline, the lighter aromatic liquids, acetone, alcohols and the like. Particularly as used to perform a final cleansing step on gasoline and other volatile liquids derived from petroleum or from coal, the provision of means for effectively and rapidly cleaning the balls of the apparatus in short frequently repeated cleaning periods renders the apparatus of great utility in performing a final stage in the refining treatment of those liquids. It is of course possible to render the operation of the cleansing means automatic at stated periods, by associating with the apparatus timed driving and valve-operating equipment of well known sort. Such timing can be adjusted to the liquid being treated and the nature of the deposits taken from it.

It is to be understood that the invention herein is directed to the structure and function of a glass-ball liquid treating apparatus which provides for cleaning the glass balls in the contact bed, or beds, thereof, and that it is not dependent upon the particular shape or interior composition of the balls. It is sufficient that the balls have a vitreous surface capable of performing the initial function of the apparatus in gathering deposits from the liquid subjected to treatment, and that they be coherent physical bodies of small but substantial size, which have a curved contour such as to permit the scouring action produced by the agitating means of the apparatus. Thus the balls may be solid spherical glass bodies as shown; they may be solid spherical glass bodies with grooved surfaces as in Craig Patent No. 2,093,311; they may be of general ovate or elliptical contour; and in all of such shapes they may, if desired, be composed of a core of nonvitreous material having a suitable vitreous coating.

What is claimed is:

1. In glass-ball liquid treating apparatus comprising a receptacle having therein at least one treating bed of glass balls, and connections for passing liquid through the said bed; a rotatable assembly in the said receptacle comprising a vertically mounted rotatable shaft, a ball-supporting platform, means to support the platform and to non-rotatably connect the platform with the shaft whereby the platform is rotated with the shaft, and an agitating element in said rotatable assembly carried by and connected with the said shaft to rotate therewith and arranged to produce agitation of the balls comprising the said treating bed and rubbing between them under the tendency for the bed of glass balls to remain stationary as the ball-supporting platform of the said rotatable assembly is rotated in cleaning the apparatus.

2. In glass-ball liquid treating apparatus comprising a receptacle having therein at least one treating bed of glass balls, and connections for passing liquid through the said bed; the combination of a rotatable shaft mounted vertically of the receptacle, a ball-supporting platform fixed on said shaft to rotate therewith in supporting relation with the said treating bed and having on the upper face thereof means for engaging the balls in direct contact therewith and creating a tendency for the balls so engaged to move relatively to balls of the bed which tend to remain in a state of rest as the shaft and ball-supporting platform are rotated, and an agitator arm fixed on the said shaft to rotate therewith and arranged to extend outwardly and downwardly therefrom in the said treating bed and to describe a path of irregular shape therein in rotation of the shaft.

3. In glass-ball liquid treating apparatus comprising a receptacle having therein at least one treating bed of glass balls, and connections for passing liquid through the said bed; the combination of a ball-supporting platform arranged in the said receptacle to support the said treating bed therein, a rotatable shaft, means to support the platform and to non-rotatably connect the platform with the shaft whereby the platform is rotated with the shaft, and an agitator arm carried by and connected with the said rotatable shaft to rotate therewith and extended outwardly and downwardly in the treating bed from its part of attachment to the shaft, and said agitator arm being out of contact with the wall of the receptacle and beveled along its leading edge in rotation to enter between and agitate the glass balls of the bed without exerting a crushing effect thereon and being deflected along its length to describe in the said treating bed a path of irregular shape in rotation of the shaft.

4. In glass-ball liquid treating apparatus comprising a receptacle having therein at least one treating bed of glass balls, and connections for passing liquid through the said bed; the combination of a ball-supporting platform arranged in the said receptacle to support the said treating bed therein, a rotatable shaft vertically mounted in the said receptacle, means to support the platform and to non-rotatably connect the platform with the shaft whereby the platform is rotated with the shaft, and an agitator arm carried by and connected with the said rotatable shaft to rotate therewith and deflected along its length to describe in the said treating bed and out of contact with the wall of the receptacle a path of irregular shape in rotation of the shaft.

5. In glass-ball liquid treating apparatus comprising a receptacle having therein a treating bed of glass balls, and connections for passing liquid through the said bed; a rotatable assembly comprising a vertically mounted rotatable shaft, and ball-supporting and agitating means carried by and connected with said shaft to rotate therewith and including a ball-supporting platform having therein through slots arranged to engage balls in direct contact with the upper face of the platform and create a tendency for the balls so engaged to move relatively to balls of the bed which tend to remain in a state of rest as the shaft and ball supporting platform are rotated and an agitator arm projectant from the said shaft into said treating bed, and in its rotation with the said ball supporting platform to describe a path through the balls thereon which tend to remain in a state of rest with respect to the platform.

THE UNION TRUST COMPANY
OF PITTSBURGH,
Administrator of the Estate of John R. Craig, Deceased,
By DAVID M. GILMORE,
Vice President.

REFERENCES CITED

The following references are of record in the file of this patent:

UNITED STATES PATENTS

| Number | Name | Date |
|---|---|---|
| 320,985 | Thomson | June 30, 1885 |
| 613,194 | Deichler | Oct. 25, 1898 |
| 707,899 | Bommarius | Aug. 26, 1902 |
| 807,513 | Stade | Dec. 19, 1905 |
| 1,686,092 | Manning | Oct. 2, 1928 |
| 1,760,216 | Stockholder | May 27, 1930 |
| 2,093,311 | Craig | Sept. 14, 1937 |
| 2,315,681 | Weisgerber | Apr. 6, 1943 |

FOREIGN PATENTS

| Number | Country | Date |
|---|---|---|
| 325 | Great Britain | 1858 |
| 615,127 | France | Oct. 2, 1926 |
| 786,239 | France | June 3, 1935 |